(12) United States Patent
Liu et al.

(10) Patent No.: US 11,404,898 B2
(45) Date of Patent: Aug. 2, 2022

(54) METHOD OF CONTROLLING AN OUTPUT POWER OF A CHARGING DEVICE, A CIRCUIT, AND A CHARGING DEVICE

(71) Applicant: Anker Innovations Technology Co., Ltd., Changsha (CN)

(72) Inventors: Guangxin Liu, Changsha (CN); Fu Jiang, Changsha (CN); Xiaolong Li, Changsha (CN)

(73) Assignee: Anker Innovations Technology Co. Ltd., Changsha (CN)

( * ) Notice: Subject to any disclaimer, the term of this patent is extended or adjusted under 35 U.S.C. 154(b) by 134 days.

(21) Appl. No.: 16/652,403

(22) PCT Filed: Feb. 9, 2018

(86) PCT No.: PCT/CN2018/076002
§ 371 (c)(1),
(2) Date: Mar. 30, 2020

(87) PCT Pub. No.: WO2019/061986
PCT Pub. Date: Apr. 4, 2019

(65) Prior Publication Data
US 2020/0287403 A1    Sep. 10, 2020

(30) Foreign Application Priority Data
Sep. 30, 2017    (CN) .......................... 201710927757.9

(51) Int. Cl.
*H02J 7/00*    (2006.01)
*H02J 7/04*    (2006.01)

(52) U.S. Cl.
CPC .......... *H02J 7/04* (2013.01); *H02J 7/00032* (2020.01); *H02J 7/0045* (2013.01); *H02J 7/0047* (2013.01); *H02J 2207/20* (2020.01)

(58) Field of Classification Search
CPC ...................................................... H02J 7/04
(Continued)

(56) References Cited

U.S. PATENT DOCUMENTS

2013/0049463 A1    2/2013  Shih et al.
2016/0094076 A1*   3/2016  Kasar ............... H04M 1/72412
                                                    320/103
(Continued)

FOREIGN PATENT DOCUMENTS

CN    102130488 A    7/2011
CN    102938573 A    2/2013
(Continued)

OTHER PUBLICATIONS

Jun. 29, 2018 (WO) International Search Report and Written Opinion—App. PCT/CN2018/076002.
(Continued)

*Primary Examiner* — Yalkew Fantu
(74) *Attorney, Agent, or Firm* — Banner & Witcoff, Ltd.

(57) ABSTRACT

A method of controlling an output power for a charging device, a circuit, and a charging device are provided. The charging device includes a first interface (405) and a second interface (406). The method includes: detecting (S101) a power demand of a device plugged in the first interface (405) and a power demand of a device plugged in the second interface (406); controlling and distributing (S102) the output power to the first interface (405) and the second interface (406) based on the power demand of the device plugged in the first interface, the power demand of the device plugged in the second interface, and a predefined power distribution principle.

20 Claims, 2 Drawing Sheets

(58) Field of Classification Search
USPC .......................................................... 320/107
See application file for complete search history.

(56) References Cited

U.S. PATENT DOCUMENTS

2018/0175628 A1* 6/2018 Chou .................... H02J 7/0068
2019/0036362 A1* 1/2019 Daravong ............. H02J 7/0047
2019/0341786 A1* 11/2019 Lee ....................... H02J 7/0021

FOREIGN PATENT DOCUMENTS

| CN | 105549712 A | | 5/2016 |
| CN | 205657474 U | | 10/2016 |
| CN | 205882808 | * | 1/2017 |
| CN | 205882808 U | | 1/2017 |
| CN | 206023306 U | | 3/2017 |
| CN | 206117270 U | | 4/2017 |
| WO | 2016183466 A1 | | 11/2016 |

OTHER PUBLICATIONS

Apr. 19, 2019 (CN) Office with Concise Explanation—App. 201701927757.9.
Oct. 8, 2019 (CN) Office Action with Concise Explanation—App. 201701927757.9.
Apr. 21, 2020 (CN) Office Action with Concise Explanation—App. 201701927757.9.
Jan. 21, 2020 (CN) Office Action with Concise Explanation—App. 201701927757.9.

* cited by examiner

METHOD OF CONTROLLING AN OUTPUT POWER OF A CHARGING DEVICE, A CIRCUIT, AND A CHARGING DEVICE

The present application is a continuation-application of International (PCT) Patent Application No. PCT/CN2018/076002 filed on Feb. 9, 2018, which claims the foreign priority of Chinese Patent Application No. 201710927757.9, filed on Sep. 30, 2017 in the National Intellectual Property Administration of China, the entire contents of which are hereby incorporated by reference in its entirety.

TECHNICAL FIELD

The present disclosure relates to the field of electronic technologies, and in particular to a method of controlling an output power of a charging device, a circuit, and a charging device.

BACKGROUND

With popularization of portable electronic products, a power adaptor and a charger are typically arranged with two charging ports to meet a requirement of an increasing number of portable devices to be charged, such that two portable devices may be charged at the same time. Meanwhile, a charging device (including the power adaptor and the charger) in a small size, which allows the charging device to be portable, may be a trend in the future.

In the related art, as a type-C interface has been launched on the market, a charger with various interfaces is brought on the market. A mainstream of the charger may be a charger with a type-A interface and the type-C interface. The type-C interface may be a power supply complying with a power delivery contract (PDC) specification of universal serial bus (USB), and the type-A may be a power supply complying with BC1.2 and a fast charging protocol. An alternating current/direct current (AC/DC) power supply having two USB interfaces with low power may be arranged with one type-A PD output and one type-A output. The type-C and the type-A may have different output voltages, a range of a type-C output PD voltage may be 3 to 21V, and a range of a type-A output voltage may be 5 to 12 V. It may be difficult to arrange only one transformer for designing such a circuit. However, when dual circuits, which are typically applied for the type-C and the type-A interfaces, are independently designed, two transformers may be required, resulting in a relatively large size of the charging device.

SUMMARY OF THE DISCLOSURE

Accordingly, the present disclosure may provide a method of controlling an output power of a charging device, a circuit, and a charging device to solve the technical problem of inconvenient charging when high-power charging is required for charging with various interfaces.

According to an aspect of the present disclosure, a method of controlling an output power for a charging device is provided. The charging device includes a first interface and a second interface. The method includes: detecting a power demand of a device plugged in the first interface and a power demand of a device plugged in the second interface; controlling and distributing an output power to the first interface and the second interface based on the power demand of the device plugged in the first interface, the power demand of the device plugged in the second interface, and a predefined power distribution principle.

According to another aspect of the present disclosure, a control circuit of an output power for a charging device is provided. The control circuit of the output power includes: a power detection circuit, arranged to detect a power demand of a device plugged in the first interface and a power demand of a device plugged in the second interface; and a power distribution controller, arranged to control and distribute an output power to the first interface and the second interface based on the power demands acquired by the power detection circuit and a predefined power distribution principle.

According to still another aspect of the present disclosure, a charging device is provided. The charging device includes the control circuit of the output power according to any one of claims 6 to 10, an AC/DC power conversion circuit, a DC/DC power conversion circuit, a recognition circuit, a first interface, and a second interface. A first input terminal of the power detection circuit of the control circuit is electrically connected to the first interface, a second input terminal of the power detection circuit is electrically connected to the second interface, and an output terminal of the power detection circuit is electrically connected to the power distribution controller. An output terminal of the power distribution controller is electrically connected to a first output terminal of the power controller, and the first output terminal of the power controller is electrically connected to the first interface. An output terminal of the AC/DC power conversion circuit is electrically connected to an input terminal of the DC/DC power conversion circuit and an input terminal of the power controller respectively. An output terminal of the DC/DC power conversion circuit is electrically connected to an input terminal of the recognition circuit. An output terminal of the recognition circuit is electrically connected to the second interface.

According to the method of controlling the output power of the charging device, the circuit, and the charging device provided by embodiments of the present disclosure, a power of a device plugged in a first interface and a power of a device plugged in a second interface may be detected, output powers may be controlled and distributed to various interfaces based on a power demand of the device plugged in the first interface and a power demand of the device plugged in the second interface, such that inconvenient charging caused by high-power charging of a charging device with various interfaces may be solved.

DETAILED DESCRIPTION

In order to clarify technical problems to be solved by the present disclosure, technical solutions provided by the present disclosure, and beneficial effects generated by the present disclosure, the present disclosure may further be illustrated in details by referring to drawings and embodiments.

It may be understood that specific embodiments described herein are for the purpose of explaining, but not to limit, the present disclosure.

Figure 1:
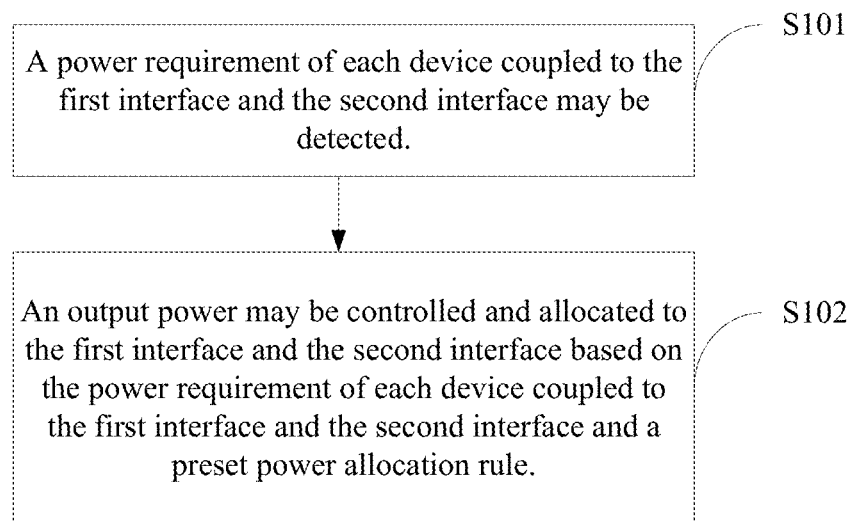
FIG. 1 is a flow chart of a method of controlling an output power of a charging device according to Embodiment 1 of the present disclosure.

The present disclosure may provide a method of controlling an output power of a charging device. The charging device may include a first interface and a second interface. As shown in FIG. 1, the method may include following operations.

In an operation of S101, a power demand of a device plugged in the first interface and a power demand of a device plugged in the second interface may be detected.

In an operation of S102, an output power may be controlled and distributed to the first interface and the second interface based on the power demand of the device plugged in the first interface, the power demand of the device plugged in the second interface, and a predefined power distribution principle.

In a potential implementation, the operation of S102 may include following operations.

When the power demand of the device plugged in the first interface and the power demand of the device plugged in the second interface exceed an overload power, the output power may be controlled and distributed to the first interface and the second interface based on the predefined power distribution principle. The overload power may be a maximum output power that the charging device is able to supply.

In a potential implementation, the predefined power distribution principle may be distributing the output power correspondingly based on a priority level of the interface. For example, the priority level for each type of interface may be preset. The operation of S102 may further include following operations.

When the power demand of the device plugged in the first interface and the power demand of the device plugged in the second interface exceed the overload power, the power demand of the interface in a higher priority level may be satisfied first, and a total output power of the charging device may be less than or equal to the overload power.

In an application, while applying the power distribution principle in an actual application scenario, various principles may be established based on various demands, which will not be illustrated in details herein.

In a potential implementation, when the first interface is a type-C interface, and the second interface is a type-A interface, the type-A interface may be set to be in the higher priority level.

Therefore, the operation of satisfying the power demand of the interface in the higher priority level and setting the total output power of the charging device to be less than or equal to the overload power may include following operations.

The output power of the type-C interface may be reduced, such that the output power of the type-A interface may meet the power demand of a second device, and the total output power of the charging device may be less than or equal to the overload power.

Specifically, when the first interface is the type-C interface, and the second interface is the type-A interface, the operation of controlling and distributing the output power to the first interface and the second interface based on the power demand of the device plugged in the first interface and the power demand of the device plugged in the second interface may include following operations.

When only the type-C interface is detected being plugged with a first device, the output power of the type-C interface may be controlled, such that the power demand of the first device may be satisfied.

In an application, the operation of controlling the output power of the type-C interface may include following operations.

Information of a high-power power data object (PDO) may be written into a power controller, such that the power controller may adjust a power of the PDO corresponding to the type-C interface to be a maximum output power based on the information of the high-power PDO. The power of the PDO may be the output power of the type-C interface. The information of the PDO may be a data packet including voltage information, current information, power information, and the like, and may be transmitted through the USB type-C interface. The maximum output power may be a maximum output power of the charging device or a maximum charging power required by the device plugged in the type-C interface for charging. Specifically, in an application, the maximum output power may be defined based on actual demands.

Specifically, when only the type-C interface is connected to a device, a power distribution controller may distribute an entirety of the maximum output power of the power supply to the type-C interface. As the power distribution controller may write information of a largest PDO (i.e., the information of the high-power PDO) to the power controller, the device may be charged in a maximum efficiency.

Alternatively, in a potential implementation, the method may further include following operations.

When the type-C interface is detected being plugged with the first device, and the type-A interface is detected being plugged with the second device, that is, when the type-C interface and the type-A interface are plugged with devices at the same time, the output power of the type-C interface may be reduced, the output power of the type-A interface may satisfy the power demand of the second device, and a total output power of the charging device may be less than or equal to the overload power. That is, the output power of the type-A interface may be satisfied firstly, such that safety of a power supply circuit may be improved.

In an application, reducing the output power of the type-C interface may include following operations.

A resetting signal may be sent to the power controller, and an output of the type-C interface may be suspended.

Information of a low-power PDO may be written into the power controller, such that the power controller may adjust the power of the PDO based on the information of the low-power PDO. The adjusted power of the PDO may be less than or equal to the maximum output power.

In an implementation, before sending the resetting signal to the power controller, the method may further include following operations.

The total output power of the type-C interface and the type-A interface may be calculated.

The total output power may be determined to be greater than the overload power or not.

The operation of reducing the output power of the type-C interface may be performed in response to the total output power being determined to be greater than the overload power.

In a potential implementation, after the information of the low-power PDO is written into the power controller, the method may further include following operations.

When an output current of the type-A interface is detected to be less than or equal to a predefined threshold, the resetting signal may be sent to the power controller again.

The information of the high-power PDO may be re-written into the power controller, such that the power controller may adjust the power of the PDO to be the maximum output power based on the information of the high-power PDO.

Specifically, when the type-C interface is plugged with the first device, and the type-A interface is plugged with the second device, a power detection circuit may send an insertion signal to the power distribution controller, the power distribution controller may send the resetting signal to the power controller, and an output of the type-C interface may be interrupted rapidly. Based on the power demand provided by the power detection circuit, the PDO information (the information of the low-power PDO) of the power controller may be re-written, the output power of the type-C interface may be reduced, such that the total output power of the charging device may not be overloaded. In response to the output current of the type-A interface being less than or equal to the predefined threshold, the second device plugged in the type-A interface may be fully charged, the power distribution controller may distribute the maximum power to the PDO, such that the first device plugged in the type-C interface may be charged faster.

In the present embodiment, considering safety of the power supply, the priority level of the type-A interface may be set to be higher than that of the type-C interface, and the output power of the type-A interface may be satisfied firstly. When the charging device is powered on, a connection state of the type-A interface and a connection state of the type-C interface may be detected, and the output power may be distributed subsequently. When each of the type-A interface and the type-C interface is detected being plugged with a device, the output power of the type-C interface may be controlled, such that the output power of the type-A interface may meet the output power demand of the type-A interface, and the total output power of the charging device may be less than or equal to the overload power.

According to the method of controlling the output power of the charging device provided in the present embodiment, the device plugged in the first interface and the device plugged in the second interface may be detected, the output power may be controlled and distributed to the first interface and/or the second interface based on the power demand of the device plugged in the first interface and/or the power demand of the device plugged in the second interface. Even if the first interface and the second interface have different output powers, only one transformer is required, such that the size of the charging device may be reduced. Meanwhile, when the charging device having various interfaces supplies power to various devices, conflicts caused by a demand of a high output power may be avoided.

On the basis of the above-mentioned embodiment, Embodiment 2 of the present disclosure may provide a control circuit of the output power for the charging device. The charging device may include the first interface and the second interface (not shown in FIG. 2).

Figure 2:
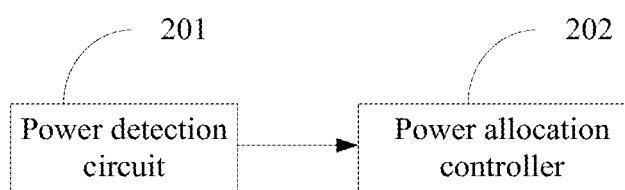
FIG. 2 is a structural diagram of a control circuit for an output power of a charging device according to Embodiment 2 of the present disclosure.

As shown in FIG. 2, an apparatus of the control circuit of the output power may include following elements.

A power detection circuit 201 may be arranged to detect a power demand of a device plugged in the first interface and a power demand of a device plugged in the second interface.

A power distribution controller 202 may be arranged to control and distribute the output power to the first interface and the second interface based on the power demand of the device plugged in the first interface, the power demand of the device plugged in the second interface, and a predefined power distribution principle.

In a potential implementation, the power distribution controller 202 may specifically be arranged to control and distribute the output powers to the first interface and the second interface based on the predefined power distribution principle, in response to the power demand of the device plugged in the first interface and the power demand of the device plugged in the second interface exceeding an overload power.

In a potential implementation, the predefined power distribution principle may be distributing the output power correspondingly based on a priority level of the interface. The power distribution controller 202 may specifically be arranged to firstly satisfy the power demand of one of the first and the second interfaces in the higher priority level, in response to the power demands of the devices plugged in the first interface and the second interface exceeding the overload power, and arranged to control a total output power of the charging device to be less than or equal to the overload power. Further, the power distribution controller 202 may be arranged to distribute a charging power pro rata in response to the various interfaces being in a same priority level, or arranged to distribute the charging power based on values of charging powers required by the device to be charged, for example, the device to be charged with a low power may be satisfied first.

In a potential implementation, the first interface may be the type-C interface, the second interface may be the type-A interface, and the type-A interface may be in the higher priority level. The power distribution controller 202 may specifically be arranged to reduce the output power of the type-C interface (i.e., the interface in a lower priority level), such that the output power of the type-A interface (i.e., the interface in the higher priority level) may satisfy the power demand of the second device, and the total output power of the charging device may be less than or equal to the overload power.

In a potential implementation, when the first interface is the type-C interface, and the second interface is the type-A interface, the power distribution controller 202 may be arranged to control the output power of the type-C interface in response to only the type-C interface being detected to be plugged with the first device, such that the power demand of the first device may be satisfied.

Figure 3:
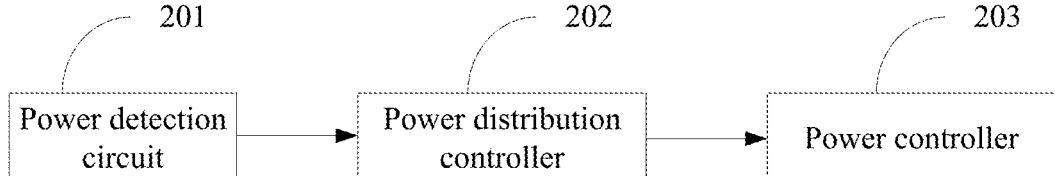
FIG. 3 is another structural diagram of the control circuit for the output power of the charging device according to Embodiment 2 of the present disclosure.

As shown in FIG. 3, in a potential implementation, the apparatus may further include a power controller 203.

The power distribution controller 202 may be arranged to write PDO information of a first output power to the power controller in response to the type-C interface being detected to be plugged with the first device.

The power controller 203 may be arranged to adjust a power of the PDO corresponding to the type-C interface to be a maximum output power based on the information of the high-power PDO.

In an application, when only the type-C interface of the power supply is connected to a device, the power distribution controller may distribute an entirety of the maximum output power of the power supply to the type-C interface. As the power distribution controller may write the information of the largest PDO (i.e., the information of the high-power PDO) to the power controller, the device may be recharged at a highest efficiency.

In a potential implementation, the power distribution controller 202 may be arranged to reduce the output power of the type-C interface in response to the type-C interface being detected to be connected with the first device and the type-A interface being detected to be connected with the second device, i.e., the type-C interface and the type-A interface connected with devices to be charged at the same time, such that the output power of the type-A interface may satisfy the power demand of the second device, and the total output power of the charging device may be less than or equal to the overload power.

Specifically, the power distribution controller 202 may be arranged to send the resetting signal to the power controller 203 in response to the type-A interface being detected to be plugged with the second device, and arranged to write the information of the low-power PDO to the power controller 203.

The power controller 203 may be arranged to suspend the output of the type-C interface based on the resetting signal, and arranged to adjust the power of the PDO corresponding to the type-C interface based on the information of the low-power PDO. The adjusted power of the PDO may be less than or equal to the maximum output power.

In a potential implementation, the power distribution controller 202 may further be arranged to calculate a total output power of the type-C interface and the type-A interface before sending the resetting signal to the power controller, determine whether the total output power is greater than the overload power, and reduce the output power of the type-C interface in response to the total output power being determined to be greater than the overload power.

In a potential implementation, after the power distribution controller 202 re-writes the information of the low-power PDO into the power controller, the power distribution controller 202 may further be arranged to send the resetting signal to the power controller 203 again in response to an output current of the type-A interface being less than or equal to a predefined threshold, and arranged to re-write the information of the high-power PDO into the power controller 203.

The power controller may further be arranged to suspend the output of the type-C interface based on the resetting signal and adjust the power of the PDO corresponding to the type-C interface to be the maximum output power based on the information of the high-power PDO.

Specifically, when the type-C interface is plugged with the first device, and the type-A interface is plugged with the second device, the power detection circuit may send an insertion signal to the power distribution controller, the power distribution controller may send the resetting signal to the power controller, and the output of the type-C interface may be suspended rapidly. Based on the power demand provided by the power detection circuit, the PDO information (the information of the low-power PDO) of the power controller may be re-written again, and the output power distributed to the type-C interface may be reduced, such that the total output power of the charging device may not be overloaded. When the output current of the type-A interface is less than or equal to the predefined threshold, the second device plugged in the type-A interface may be fully charged, the power distribution controller may distribute the maximum power to the PDO, such that the device plugged in the first interface may be charged faster.

In the present embodiment, considering safety of the power supply, the priority level of the type-A interface may be set to be higher than that of the type-C interface, and the output power of the type-A interface may be satisfied first. When the charging device is powered on, a connection state of the first interface and a connection state of the second interface may be detected first, and the output power may be distributed subsequently. When each of the type-A interface and the type-C interface is detected to be connected with a device, the output power of the type-C interface may be controlled, such that the output power of the type-A interface may satisfy the output power demand of the type-A interface, and the total output power of the charging device may be less than or equal to the overload power.

According to the control circuit of output power for the charging device provided in the present embodiment, the device plugged in the first interface and the device plugged in the second interface may be detected, the output power may be controlled and distributed to the first interface and/or the second interface based on a power demand of the device plugged in the first interface and a power demand of the device plugged in the second interface. Even if the first interface and the second interface may have different output powers, only one transformer may be required, such that a size of the charging device may be reduced. Meanwhile, when the charging device having various interfaces supplies power to various devices, conflicts caused by a demand of a high output power may be avoided.

Figure 4:
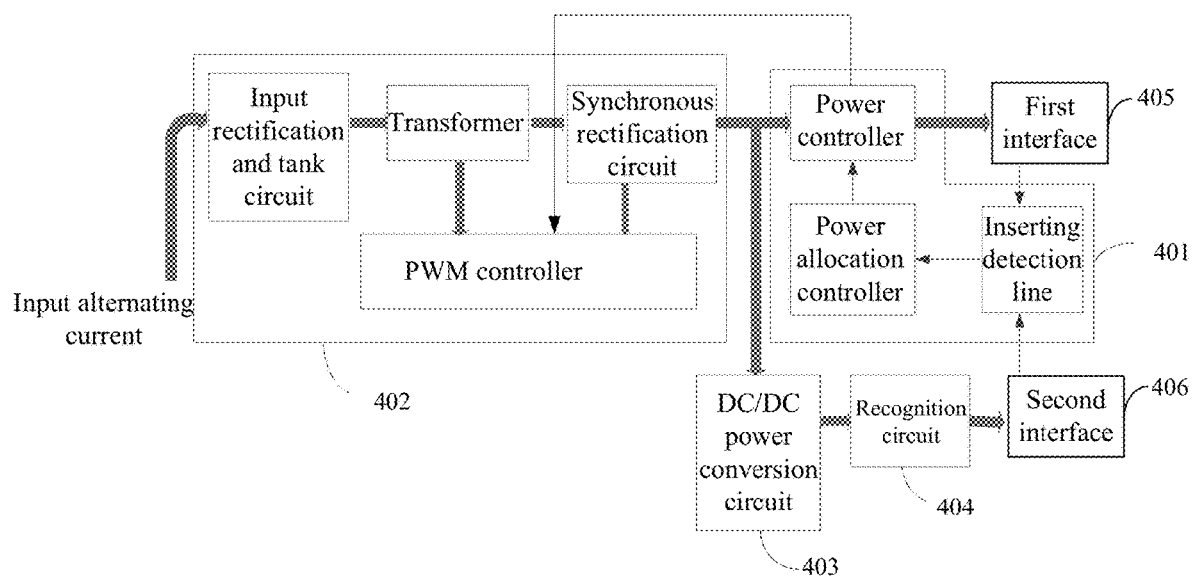
FIG. 4 is a structural diagram of a charging device according to Embodiment 3 of the present disclosure.

On the basis of the above-mentioned embodiment, Embodiment 3 of the present disclosure may provide a charging device, as shown in FIG. 4. The charging device may include following components.

A control circuit of output power 401, an AC/DC power conversion circuit 402, a DC/DC power conversion circuit 403, a recognition circuit 404, a first interface 405, and a second interface 406 may be arranged. The recognition circuit may include various protocol chips of various protocols, such as a protocol chip complying with a quick charging protocol QC3.0 based on a Qualcomm definition, or a protocol chip complying with a manufacturer customized protocol, such as a protocol chip complying with ANKER-defined quick charging protocol PIQ.

A structure of the control circuit of output power 401 may be identical with that of the control circuit of output power described in Embodiment 2 and may include a power detection circuit, a power controller, and a power distribution controller.

A first input terminal of the power detection circuit may be electrically connected to the first interface 405, a second input terminal of the power detection circuit may be electrically connected to the second interface 406, and an output terminal of the power detection circuit may be electrically connected to the power distribution controller.

An output terminal of the power distribution controller may be electrically connected to a first output terminal of the power controller, and a first output terminal of the power controller may be electrically connected to the first interface 405.

An output terminal of the AC/DC power conversion circuit 402 may be electrically connected to an input terminal of the DC/DC power conversion circuit 403 and an input terminal of the power controller respectively.

An output terminal of the DC/DC power conversion circuit 403 may be electrically connected to an input terminal of the recognition circuit 404.

An output terminal of the recognition circuit 404 may be electrically connected to the second interface.

In an application, the AC/DC power conversion circuit 402 may include an input rectification and tank circuit, a transformer, a synchronous rectification MOS, and a pulse width modulation (PWM) controller having a power switch.

An output terminal of the input rectification and tank circuit may be electrically connected to an input terminal of the transformer.

A first output terminal of the transformer may be electrically connected to a first input terminal of the PMW controller, and a second output terminal of the transformer may be electrically connected to a first input terminal of the synchronous rectification MOS.

An output terminal of the PMW controller may be electrically connected to a second input terminal of the synchronous rectification MOS, and a second input terminal of the PMW controller may be electrically connected to a second output terminal of the power controller.

An output terminal of the synchronous rectification MOS may be electrically connected to an input terminal of the DC/DC power conversion circuit 403 and the input terminal of the power controller respectively.

In the present embodiment, the AC/DC power conversion circuit may be arranged with only one isolated transformer to perform transformation, an output range may be a range of the PD power.

In an application, a CCG3 controller may be arranged to serve as the power controller. The CCG3 controller may recognize the power demand of the device and adjust the power of the PDO.

An SN8P2711A single chip microcomputer may be arranged to serve as a power dynamic distribution controller.

An F75293 integrated circuit may be arranged to serve as the recognition circuit.

The DC/DC power conversion circuit may use an SC8703 chip, and an output thereof may meet criteria corresponding to the protocol chip included in the recognition circuit, such as the QC3.0 and the PIQ.

In an application, the first interface may be the type-C interface, and the second interface may be the type-A interface.

When only the type-C interface of the power supply is connected with a device, the power distribution controller may distribute an entirety of the maximum output power of the power supply to the type-C interface, and the power distribution controller may write the information of a largest PDO (i.e., the information of the high-power PDO) into the power controller, such that the device may be charged at a highest efficiency.

When the type-C interface is plugged with the first device, and the type-A interface is plugged with the second device, the power detection circuit may send the insertion signal to the power distribution controller, the power distribution controller may send the resetting signal to the power controller, and the output of the type-C interface may be suspended rapidly. Based on the power demand provided by the power detection circuit, the PDO information (the information of the low-power PDO) of the power controller may be re-written, the output power distributed to the type-C interface may be reduced, such that the total output power of the charging device may not be overloaded. When the output current of the type-A interface is less than or equal to the predefined threshold, the second device plugged in the type-A interface may be fully charged, and the power distribution controller may distribute the maximum power to the PDO, such that the first device connected to the type-C interface may be charged faster.

In the present embodiment, considering safety of the power supply, the priority level of the output of the type-A interface may be set to be higher than that of the type-C interface, and the output power of the type-A interface may be satisfied first. When the charging device is powered on, a connection state of the first interface and a connection state of the second interface may be detected, and the output power may be distributed subsequently. When each of the type-A interface and the type-C interface is detected to be connected with a device at the same time, the output power of the type-C interface may be controlled, such that the output power of the type-A interface may satisfy the output power demand of the type-A interface, and the total output power of the charging device may be less than or equal to the overload power.

According to the charging device provided in the present embodiment, the device plugged in the first interface and the device plugged in the second device may be detected, and the output power may be controlled and distributed to the first interface and/or the second interface based on the power demand of the device plugged in the first interface and/or the power demand of the device plugged in the second interface. Even if the first interface and the second interface may have different output powers, only one transformer may be arranged, such that a size of the charging device may be reduced. Meanwhile, when the charging device having various interfaces supply power to various devices, conflicts caused by a demand of a high output power may be avoided.

Preferred embodiments of the present disclosure are illustrated by referring to the drawings, but do not limit the scope of the present disclosure. Any modification, equivalent replacement and improvement performed by any ordinary skilled personnel in the art, without departing from the concept and essence of the present disclosure, should be within the scope of the present disclosure.

What is claimed is:

1. A method of controlling an output power for a charging device, comprising:
    detecting a power demand of a first device connected to a type-C interface of the charging device and a power demand of a second device connected to a type-A interface of the charging device, wherein the type-A interface has a higher priority than the type-C interface;
    determining, based on the power demand of the first device and the power demand of the second device, that a total of the power demand of the first device and the power demand of the second device exceeds an overload power; and
    based on the determining and based on that the type-A interface has a higher priority than the type-C interface, reducing an output power of the type-C interface such that the total of the power demand of the first device and the power demand of the second device does not exceed an overload power.

2. The method according to claim 1, wherein the reducing comprises:
    distributing the output power of the type-C interface and an output power of the type-A interface based on a predefined distribution principle.

3. The method according to claim 1, wherein the reducing comprises:
    sending a resetting signal to a power controller;
    suspending an output of the type-C interface; and
    writing information of a low-power power data object (PDO) into the power controller, wherein the power controller is configured to adjust a power of a PDO corresponding to the type-C interface based on the information of the low-power PDO, and wherein the adjusted power of the PDO corresponding to the type-C interface is less than or equal to a maximum output power.

4. The method according to claim 3, further comprising:
sending a second resetting signal to the power controller in response to an output current of the type-A interface being detected to be less than or equal to a predefined threshold; and
writing information of a high-power PDO into the power controller, wherein the power controller is configured to adjust the power of the PDO corresponding to the type-C interface to be the maximum output power based on the information of the high-power PDO.

5. The method according to claim 1, further comprising:
detecting that only the type-C interface is connected to a device; and
based on the detecting, controlling the output power of the type-C interface such that the power demand of the first device is satisfied.

6. The charging device of claim 5, wherein the type-A interface has a higher priority than the type-C interface.

7. The method according to claim 1, further comprising:
detecting that only the type-C interface is connected to a device; and
based on the detecting, distributing an entirety of a maximum output power of the charging device to the type-C interface.

8. The method according to claim 1, further comprising:
detecting that only the type-C interface is connected with the first device; and
based on the detecting, distributing an entirety of a maximum output power of the charging device to the type-C interface.

9. The method according to claim 1, wherein the reducing comprising suspending the output power of the type-C interface.

10. The method according to claim 1, further comprising:
based on the determining and based on that the type-A interface has a higher priority than the type-C interface, maintaining an output power of the type-A interface.

11. A control circuit of an output power for a charging device, comprising:
a power detection circuit configured to:
detect a power demand of a first device connected to a type-C interface of the charging device and a power demand of a second device connected to a type-A interface of the charging device, wherein the type-A interface has a higher priority than the type-C interface; and
a power distribution controller configured to:
determine, based on the power demand of the first device and the power demand of the second device, that a total of the power demand of the first device and the power demand of the second device exceeds an overload power; and
reduce, based on a determination that the total of the power demand of the first device and the power demand of the second device exceeds the overload power and based on that the type-A interface has a higher priority than the type-C interface, an output power of the type-C interface such that the total of the power demand of the first device and the power demand of the second device does not exceed the overload power.

12. The control circuit according to claim 11, wherein the power distribution controller is further configured to distribute the output power to the type-C interface and an output power of the type-A interface based on a predefined distribution principle.

13. The control circuit according to claim 11, further comprising a power controller, wherein:
the power distribution controller is further configured to send a resetting signal to the power controller and write information of a low-power power data object (PDO) into the power controller; and
the power controller is configured to suspend an output of the type-C interface based on the resetting signal, and to adjust a power of a PDO corresponding to the type-C interface based on the information of the low-power PDO, wherein the adjusted power of the PDO corresponding to the type-C interface is less than or equal to the maximum output power.

14. The control circuit according to claim 13, wherein the power distribution controller is further configured to:
send a second resetting signal to the power controller and write information of a high-power PDO into the power controller in response to an output current of the type-A interface being less than or equal to a predefined threshold; and
suspend the output of the type-C interface based on the second resetting signal and a adjust a power of the PDO to be the maximum output power based on the information of the high-power PDO.

15. The control circuit according to claim 11, wherein:
the power detection circuit is further configured to detect that only the type-C interface is connected to a device; and
the power distribution controller is further configured to control, based on the detection that only the type-C interface is connected to a device, the output power of the type-C interface such that the power demand of the first device is satisfied.

16. The control circuit according to claim 11, wherein:
the power detection circuit is further configured to detect that only the type-C interface is connected to a first device; and
the power distribution controller is further configured to distribute, based on the detection that only the type-C interface is connected to a device, an entirety of a maximum output power of the charging device to the type-C interface.

17. The control circuit according to claim 11, wherein the power distribution controller is configured to reduce the output power of the type-C interface by suspending the output power of the type-C interface.

18. The control circuit according to claim 11, wherein the power distribution controller is configured to maintain an output power of the type-A interface based on the determination that the total of the power demand of the first device and the power demand of the second device exceeds the overload power and based on that the type-A interface has a higher priority than the type-C interface.

19. A charging device comprising:
a control circuit comprising a power detection circuit, a power distribution controller, and a power controller;
an AC/DC power conversion circuit;
a DC/DC power conversion circuit;
a recognition circuit;
a type-C interface; and
a type-A interface, wherein:
a first input terminal of the power detection circuit of the control circuit is electrically connected to the type-C interface, a second input terminal of the power detection circuit is electrically connected to the type-A interface, and an output terminal of the power detection circuit is electrically connected to the power distribution controller, wherein the power distribution controller is configured to reduce, based on a determination that a total of a power demand of a first device connected to the type-C interface and a power demand of a second device connected to the type-A interface exceeds an overload power and based on that the type-A interface has a higher priority than the type-C interface, an output power of the type-C interface such that the total of the power demand of the first device and the power demand of the second device does not exceed the overload power;

an output terminal of the power distribution controller is electrically connected to a first output terminal of the power controller, and the first output terminal of the power controller is electrically connected to the first interface;

an output terminal of the AC/DC power conversion circuit is electrically connected to an input terminal of the DC/DC power conversion circuit and an input terminal of the power controller respectively;

an output terminal of the DC/DC power conversion circuit is electrically connected to an input terminal of the recognition circuit; and an output terminal of the recognition circuit is electrically connected to the second interface.

20. The charging device according to claim 19, wherein the AC-DC power conversion circuit comprises an input rectification and tank circuit, a transformer, a synchronous rectification metal-oxide-semiconductor (MOS), and a pulse width modulation (PWM) controller with a power switch;

an output terminal of the input rectification and tank circuit is electrically connected to an input of the transformer;

a first output terminal of the transformer is electrically connected to a first input terminal of the PMW controller, a second output terminal of the transformer is electrically connected to a first input terminal of the synchronous rectification MOS;

an output terminal of the PMW controller is electrically connected to a second input terminal of the synchronous rectification MOS, a second input terminal of the PMW controller is electrically connected to a second output terminal of the power controller; and an output terminal of the synchronous rectification MOS is electrically connected to the input terminal of the DC/DC power conversion circuit and the input terminal of the power controller respectively.

* * * * *